METHOD OF MAKING MAGNETIC RECORDING UNITS

Original Filed June 29, 1954 3 Sheets-Sheet 1

INVENTOR.
KENNETH R. WISNER
BY S.C. Yuter
ATTORNEY

MAGNETIC UNIT 10

INVENTOR.
KENNETH R. WISNER
BY S.C. Yuter
ATTORNEY.

July 5, 1960 K. R. WISNER 2,943,384

METHOD OF MAKING MAGNETIC RECORDING UNITS

Original Filed June 29, 1954 3 Sheets-Sheet 3

INVENTOR.
KENNETH R. WISNER

BY S.C. Yuter

ATTORNEY.

United States Patent Office 2,943,384
Patented July 5, 1960

2,943,384

METHOD OF MAKING MAGNETIC RECORDING UNITS

Kenneth R. Wisner, New York, N.Y., assignor, by mesne assignments, to Curtiss-Wright Corporation, Carlstadt, N.J., a corporation of Delaware Original application June 29, 1954, Ser. No. 439,961. Divided and this application Aug. 3, 1955, Ser. No. 526,289

5 Claims. (Cl. 29—155.59)

This invention relates to magnetic systems and more particularly to accurately spacing the gaps of magnetic reading and recording units.

Increased use is being made of magnetic recording devices to delay electronic signals for a fixed period of time. For example, a channel on a rotating magnetic drum may be scanned by two spaced magnetic heads. One of the magnetic heads records a signal on the magnetic drum and the other head reads the signal. The time which elapses between the recording and reading of the signal is the time by which the signal is delayed.

The distance between the gaps of the two heads is directly related to the delay or time lapse between the recording and reading of the signal. The delay requirements are usually so specific that the distance between the gaps of the reading and recording heads must be held to a very close tolerance. A similar requirement may arise in spacing the gaps of recording and erasing heads.

It is accordingly an object of the invention to provide an improved method of making a magnetic unit having two gaps.

A further object of the invention is to provide an improved method for assembling magnetic heads so that their gaps are spaced a fixed distance apart.

Another object of the invention is to provide an improved method of making a magnetic unit having gaps which are spaced at a dimension having a very small tolerance.

Briefly, in accordance with the invention a magnetic unit is provided having a lamination of magnetic and non-magnetic materials. The lamination is ground to a dimension having a very small tolerance and is assembled with additional magnetic components in a non-magnetic housing to form separate magnetic heads which are rigidly spaced from one another.

An advantage of the invention is that a magnetic unit having magnetic heads with gaps which are very accurately spaced may be manufactured readily and inexpensively.

Another advantage of magnetic units made in accordance with the invention is that the magnetic heads are well shielded from each other and there is substantially no interaction between the heads.

Other advantages are that the units are easy to mount, simple to construct, rugged in design, and the distance between gaps can be determined with precision prior to assembly.

The invention will be more readily understood from the following description taken together with the accompanying drawings in which.

Figure 1:
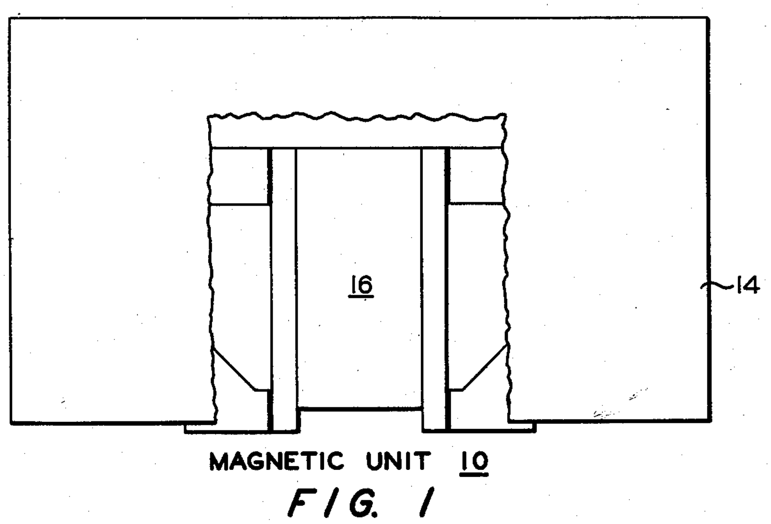
Fig. 1 is a front view of a magnetic unit made in accordance with the invention with a portion of the exterior broken away to show the lamination.
Figure 2:
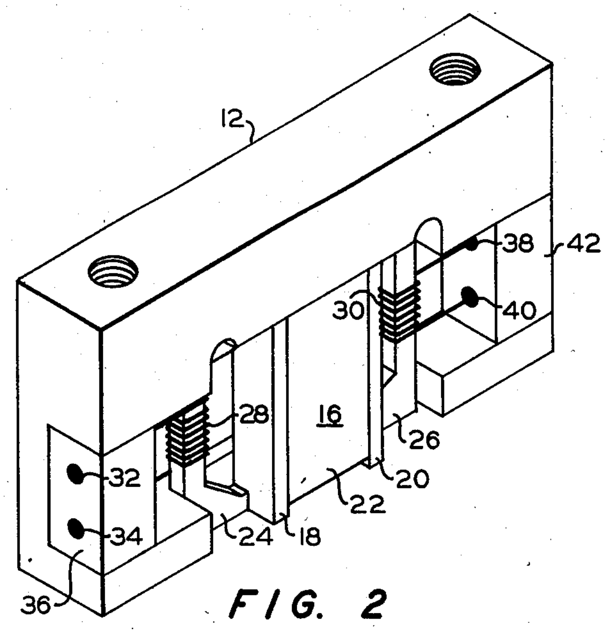
Fig. 2 is a perspective view of the magnetic unit with the coverplate removed to show the interior.

Referring now to the magnetic unit 10 in Figs. 1 and 2, apparatus is shown which comprises two magnetic heads having gaps. The gaps are separated by a predetermined distance.

The magnetic unit 10 includes a housing 12 and a coverplate 14. These components are made of non-magnetic material which is a good electrical conductor and are preferably made of a material which is readily soldered such as brass.

Mounted at the center of the housing 12 is lamination 16 which comprises two cores or sheets 18 and 20 of ferrite. The sheets 18 and 20 sandwich a block 22 which is made of a material such as brass. As will later be shown, the lamination 16 is an important feature of the invention.

Adjacent to the sheets 18 and 20 are shaped cores 24 and 26, respectively. The cores 24 and 26 are made of ferrite and have wound thereon the coils 28 and 30, respectively.

The ends of coil 28 are soldered to terminals 32 and 34 which are electrical conductors extending through a block 36. The ends of coil 30 are soldered to terminals 38 and 40 which extend through block 42. The blocks 36 and 42 are made of a suitable non-conductive material such as phenolic canvas.

Figure 3:
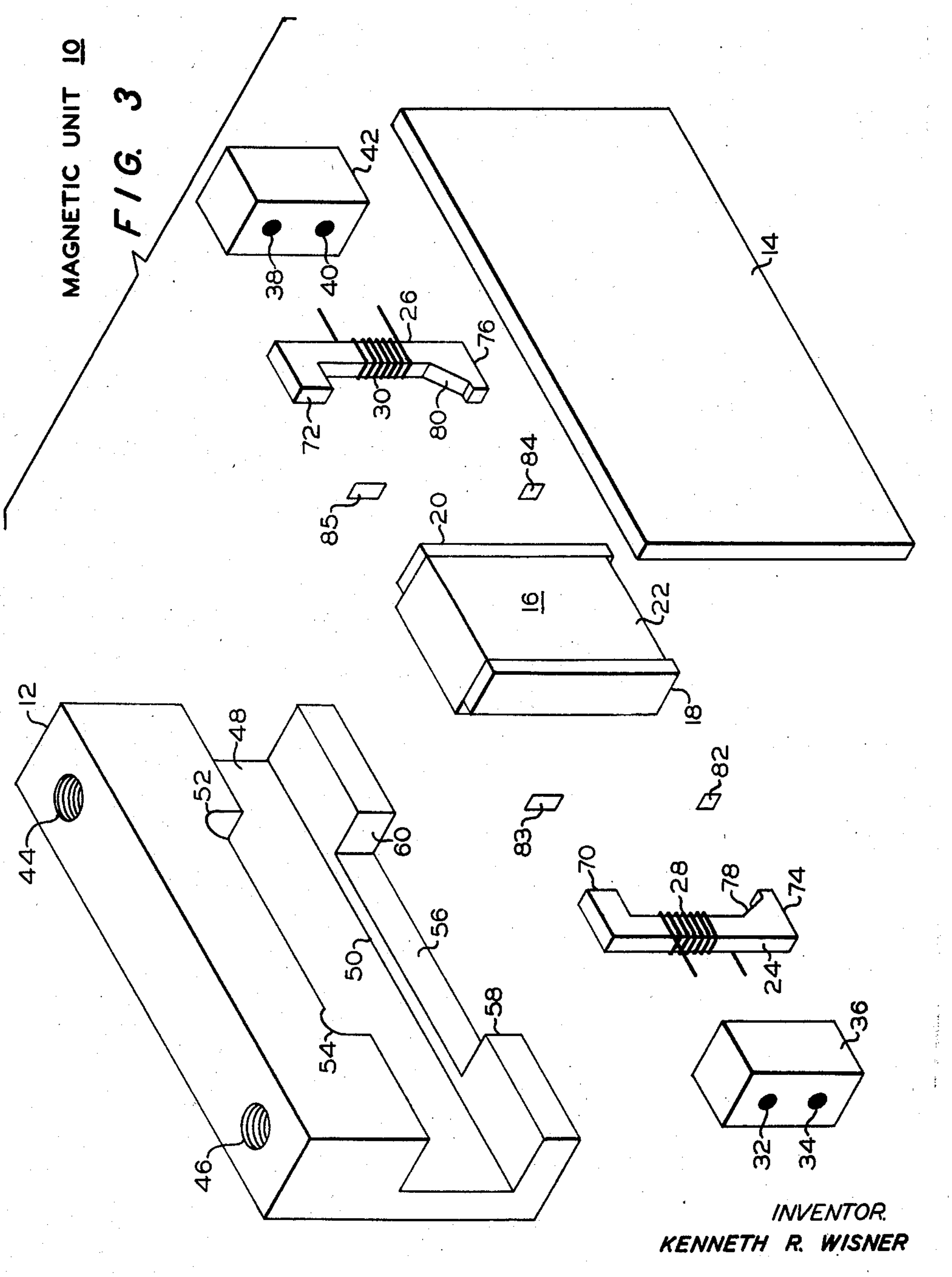
Fig. 3 is an exploded view of the apparatus shown in Figs. 1 and 2.

Referring now to the apparatus in Fig. 3, an exploded view of the magnetic unit 10 is shown to illustrate the components more clearly.

The housing 12 includes threaded holes 44 and 46 which enable the magnetic unit 10 to be rigidly mounted with respect to a magnetic drum or the like.

Milled into the housing 12 is groove 48 which leaves a horizontal beam 50. Groove 56 is vertically formed in housing 12 forming faces 58 and 60 in horizontal beam 50. Holes 52 and 54 may be machined to prevent ragged corners in groove 56.

Lamination 16 is formed by bonding the ferrite sheets 18 and 20 to opposite sides of brass block 22 with a high temperature bonding material. A suitable bonding material is Araldite 101 casting resin. The lamination is originally made to a thickness greater than desired and is then ground down to a precise dimension so that the faces of sheets 18 and 20 are spaced by a distance having a very small tolerance. This process is an important feature of the invention and will hereinafter be discussed in greater detail.

Lamination 16 is inserted into the cavity of housing 12 and brass block 22 is soldered to the brass of housing 12 including beam 50. Brass block 22 has a step formed in its back portion to accommodate beam 50.

Cores 24 and 26 are identically shaped and respectively have top legs 70 and 72 and bottom legs 74 and 76. It should be noted in respect to cores 24 and 26 that the cross-sectional areas of top legs 70 and 72 are greater than the cross-sectional areas of bottom legs 74 and 76 at their ends. This construction decreases the significance of the gaps which exist between leg 70 and sheet 18 and between leg 72 and sheet 20.

Angles 78 and 80 of cores 24 and 26 strengthen the core construction and insure that magnetic fringing is concentrated at the gaps which are adjacent to legs 74 and 76.

Cores 24 and 26 are positioned in the cavity of housing 12 so as to form two separate magnetic heads in conjunction with sheets 18 and 20. The heads are in the same plane and the gaps of the heads are filled with sheets 82, 83, 84 and 85 which are made of non-magnetic material such as mica or copper.

It will be noted that groove 48 receives the coils 28 and 30 so that cores 24 and 26 rest against beam 50. Cores 24 and 26 are cemented into place with a low temperature cure potting resin.

Blocks 36 and 42 are cemented into groove 48 and ends of coils 28 and 30 are appropriately soldered to terminals 32, 34, 38 and 40.

The assembled unit is covered by brass coverplate 14 and all brass to brass contacts are soldered together.

It should be noted that it is not necessary for cores 24 and 26 to butt up against faces 58 or 60 since cores 24 and 26 are held in place by the potting resin. It is also seen that the cores 24 and 26 and the ferrite sheets 18 and 20 extend below the brass block 22. This permits the magnetic heads of the magnetic unit 10 to be positioned closely to a curved surface (such as that of a magnetic drum) without danger of contact between the brass block 22 and the curved surface.

It should further be noted that each of the magnetic heads is enclosed in brass except where it extends out of the housing 12. Thus each magnetic head is well shielded and interaction or "crosstalk" between heads is minimized.

Figure 4:
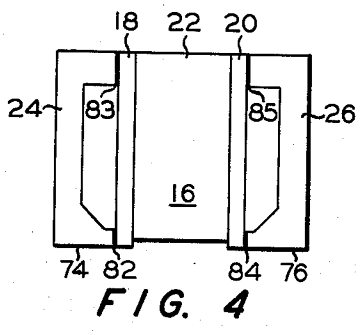
Fig. 4 is a front view of the spaced magnetic heads.
Figure 5:
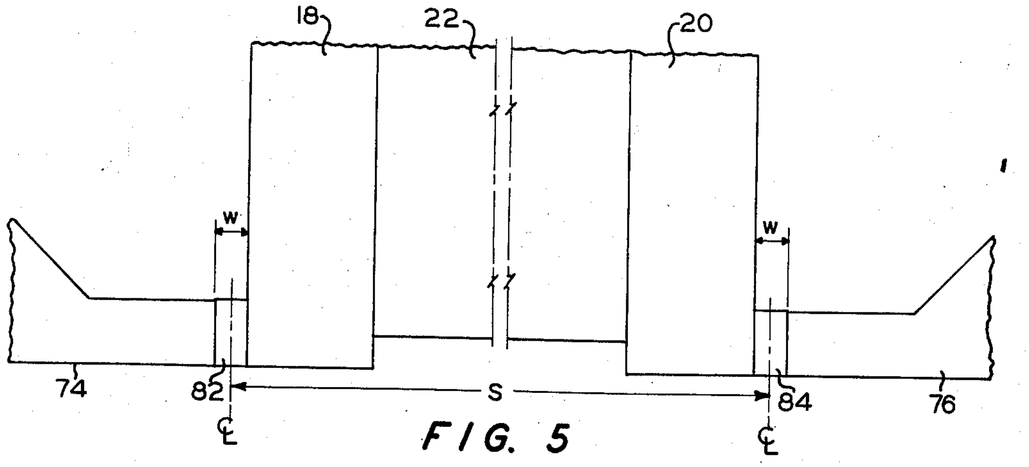
Fig. 5 is an enlarged view of a portion of Fig. 4 which illustrates the gap spacing to be accurately controlled.
Figure 6:
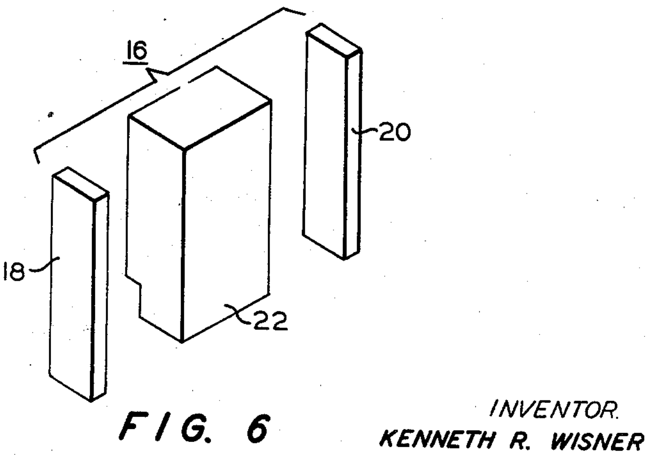
Fig. 6 is an exploded view of the lamination.

Referring now to Figs. 4, 5 and 6, the magnetic head and lamination structures are shown in greater detail. As previously noted, there are two magnetic heads. One of the heads comprises sheet 18 and core 24 and the other comprises sheet 20 and core 26. The heads are separated by brass block 22 and the gaps are filled with sheets 82, 83, 84 and 85 of non-magnetic material.

In the illustrated case, the gaps are of width W. It is desired to space the center lines of the gaps by a distance S and only a small tolerance on distance S is permissible.

The sheets 18 and 20 are cemented to brass blocks 22 so as to form lamination 16 whose thickness or width is greater than $S-W$. Lamination 16 is then ground down to dimension $S-W$ and this operation may conveniently be performed to achieve a result with a tolerance of plus or minus .0001″.

When the cores 24 and 26 are "faced" or positioned adjacent to lamination 16 with sheets 82, 83, 84 and 85, the distance between the center lines of the gaps may be expressed as $$S-W+2(W/2)$$

or simply as S.

Since the heads and their associated gaps are spaced by means of a grinding or similar operation and the lamination is formed by simply joining planar faces together, this method of spacing heads is both very accurate and convenient.

It should be understood that the method is equally applicable to spacing the heads in relation to points or planes other than on the gap centerlines. For example, the outer extremities of the gaps can be spaced by the use of the disclosed method or points on the heads themselves may be so spaced.

Thus, in accordance with the invention, a magnetic unit and a method for preparing the same has been disclosed. The gaps are spaced by a distance having a very small tolerance and the unit is easy to mount, simple to construct and rugged in design. The method of preparing the unit is simple and provides accurate results and the magnetic heads are well shielded from each other so as to minimize interaction.

There will now be obvious to those skilled in the art many modifications and variations utilizing the principles set forth and realizing many or all of the objects and advantages of the apparatus and method described but which do not depart essentially from the spirit of the invention.

This application is a division of the co-pending application, U.S. Serial No. 439,961, filed June 29, 1954, now abandoned, and assigned to the same assignee.

What is claimed is:

1. A method of preparing a magnetic unit comprising bonding a non-magnetic block between sheets of magnetic material to form a lamination, shaping the outer faces of said sheets of magnetic material to reduce said lamination to a desired thickness, spacing cores of magnetic material from the outer faces of said sheets of magnetic material by a film of non-magnetic material, forming a casing to contain said lamination and said cores and securing said lamination and said cores in said casing.

2. A method of spacing the gaps of two magnetic heads so that the center lines of the gaps are accurately spaced at a predetermined distance comprising bonding a non-magnetic block between two sheets of magnetic material to form a lamination whose thickness is greater than the desired distance between the inner edges of the gaps of said heads, shaping the outer faces of said sheets of magnetic material to reduce the thickness of said lamination to said desired distance, spacing cores of magnetic material from the outer faces of said sheets of magnetic material by nonmagnetic sheets of a thickness equal to the width of each of said gaps, forming a casing to retain said lamination, said cores and said non-magnetic sheets in spaced relation, and securing said lamination, said cores and said sheets in said casing.

3. A method of spacing the gaps of two magnetic heads so that the center lines of the gaps are spaced at a predetermined distance within a very small tolerance range, said method comprising bonding a brass block between two sheets of ferrite to form a lamination whose thickness is greater than the desired distance between the inner edges of the gaps of said heads, grinding the outer faces of said ferrite sheets to reduce said lamination to a thickness equal to said desired distance, spacing shaped cores of ferrite from the outer faces of said sheets of ferrite by non-magnetic sheets of a thickness equal to the width of each gap to form a sub-unit, shaping a brass housing to receive said sub-unit, soldering said brass block of said sub-unit ot said brass housing and cementing said shaped cores into position with potting resin.

4. A method of spacing the gaps of two magnetic heads so that the center lines of the gaps are spaced at a predetermined distance having a very small tolerance range, said method comprising bonding a brass block between two sheets of ferrite to form a lamination whose thickness is greater than the desired distance between the inner edges of the gaps of said heads, grinding the outer faces of said ferrite sheets to reduce said lamination to a thickness equal to said desired distance, spacing shaped cores of ferrite from the outer faces of said sheets of ferrite by non-magnetic sheets of a thickness equal to the width of each gap to form a sub-unit, shaping a brass housing to receive said sub-unit, soldering said brass block of said sub-unit to said brass housing, cementing said shaped cores into position with potting resin, shaping a brass covering plate to cover said brass housing and soldering said brass covering plate to said brass housing and said brass block to form a covered unit.

5. A method of spacing the gaps of two magnetic heads so that the center lines of the gaps are spaced at a predetermined distance having a very small tolerance range, said method comprising bonding a brass block between two sheets of ferrite with a high temperature bonding material to form a lamination whose thickness is greater than the desired distance between the inner edges of the gaps of said heads, grinding the outer faces of said ferrite sheets to reduce said lamination to a thickness equal to said desired distance, winding coils on two shaped cores of ferrite, spacing said shaped cores of ferrite from the outer faces of said sheets of ferrite by non-magnetic sheets of a thickness equal to the width of each gap to form a sub-unit, shaping a brass housing to receive said sub-unit and to receive two non-conductive terminal blocks having conductive terminals, soldering said brass block of said sub-unit to said brass housing, cementing said shaped cores into position with potting resin, cementing said terminal blocks into said brass housing with potting resin, soldering the ends of said coils to said conductive terminals, shaping a brass covering plate to cover said brass housing and soldering said brass covering plate to said brass housing and said brass block to form a covered unit.

References Cited in the file of this patent

UNITED STATES PATENTS 2,715,659 Ibuka et al. ------------ Aug. 16, 1955